United States Patent [19]

Chiba et al.

[11] Patent Number: 5,368,620
[45] Date of Patent: Nov. 29, 1994

[54] DEVICE FOR CLEANING SURROUNDING AIR FED TO PASSENGER COMPARTMENT OF MOTOR VEHICLE

[75] Inventors: Takatoshi Chiba; Shigeru Kobayashi, both of Omiya, Japan

[73] Assignee: Kansei Corporation, Omiya, Japan

[21] Appl. No.: 113,639

[22] Filed: Aug. 31, 1993

[30] Foreign Application Priority Data

| | | | |
|---|---|---|---|
| Sep. 1, 1992 | [JP] | Japan | 4-233557 |
| Sep. 1, 1992 | [JP] | Japan | 4-233558 |
| Oct. 23, 1992 | [JP] | Japan | 4-286339 |
| Oct. 26, 1992 | [JP] | Japan | 4-287805 |
| Dec. 28, 1992 | [JP] | Japan | 4-347524 |
| Dec. 28, 1992 | [JP] | Japan | 4-347631 |

[51] Int. Cl.$^5$ ............................ B01D 35/143
[52] U.S. Cl. ........................ 55/274; 55/311; 55/312; 55/385.3; 96/60; 454/146; 454/158
[58] Field of Search ............ 55/274, 385.3, 310–312; 96/60; 454/146, 158

[56] References Cited

U.S. PATENT DOCUMENTS

| | | | |
|---|---|---|---|
| 3,303,769 | 2/1967 | Williams | 454/158 X |
| 4,242,951 | 1/1981 | Bemiss | 55/385.3 X |
| 4,340,112 | 7/1982 | Sutoh et al. | 454/158 X |
| 4,606,422 | 8/1986 | Jewett | 55/385.3 X |
| 4,779,517 | 10/1988 | Weller et al. | 454/158 X |
| 4,909,566 | 3/1990 | Hashimoto et al. | 454/146 X |
| 5,050,487 | 9/1991 | Arold et al. | 454/158 |
| 5,059,224 | 10/1991 | Kikkawa et al. | 55/274 X |
| 5,120,334 | 6/1992 | Cooper | 55/274 X |
| 5,217,513 | 6/1993 | Armbruster | 55/274 |
| 5,221,292 | 6/1993 | Aoyama | 55/385.3 X |

*Primary Examiner*—Richard L. Chiesa
*Attorney, Agent, or Firm*—Foley & Lardner

[57] ABSTRACT

Various types of air cleaning devices for cleaning air fed to a passenger compartment of a motor vehicle are described. These air cleaning devices are arranged to incorporate with a cowl top structure of the vehicle. In one type, an air filter is disposed in an external air introduction passage led to the passenger compartment, and when the air filter is blocked with arrested dusts, a bypass passage is established to keep the feeding of atmospheric air to the passenger compartment. In a modified type, the bypass passage is instantly blocked and an internal air circulation mode is established. In one type, an electrostatic air collecting unit is used for arresting very fine particles in the atmospheric air fed to the passenger compartment. In order to achieve a smoothed air flow in the electrostatic air collecting unit, smoothly curved air guide passages are defined between positive and negative electrode plates. In one type, two hood ridge reinforcing hollowed structures are used for feeding the air box and thus the passenger compartment with a satisfied amount of atmospheric air. In order to facilitate the maintenance of the air filter in the air box, an inspection aperture is provided in the cowl top. Usually, the inspection aperture is covered by a lid.

15 Claims, 16 Drawing Sheets

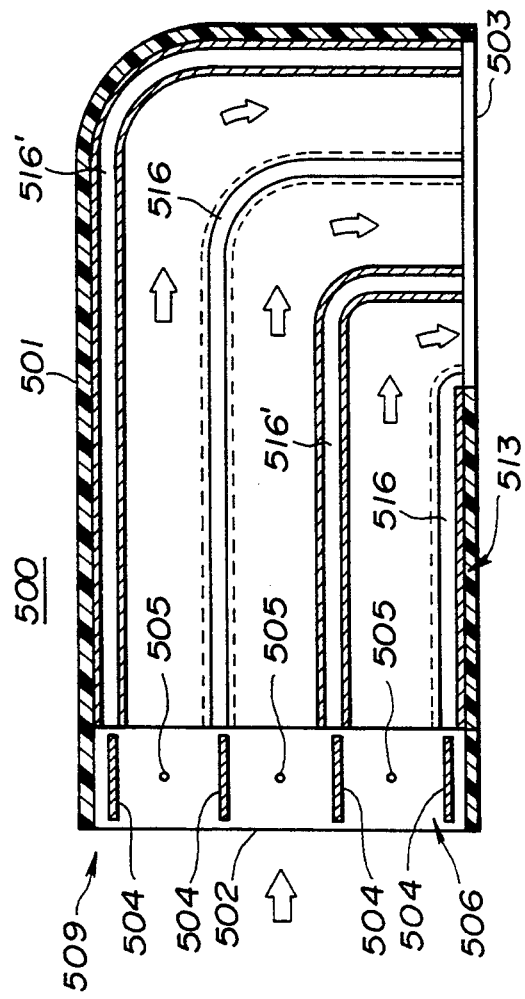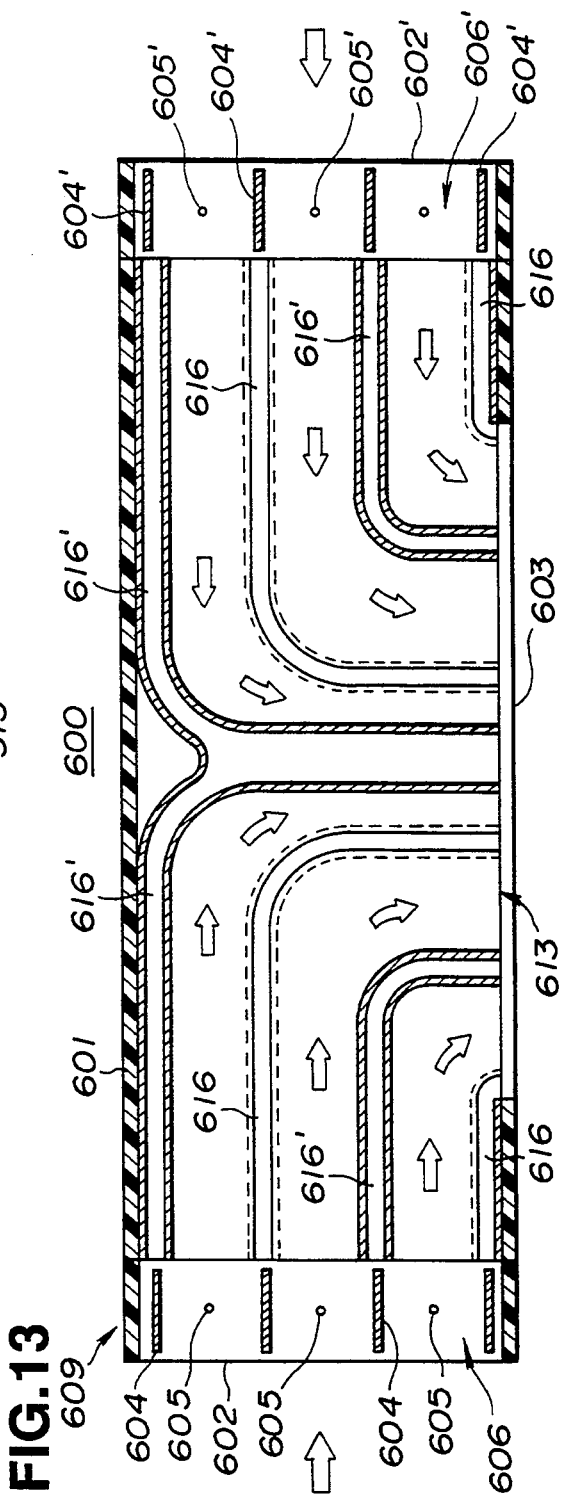

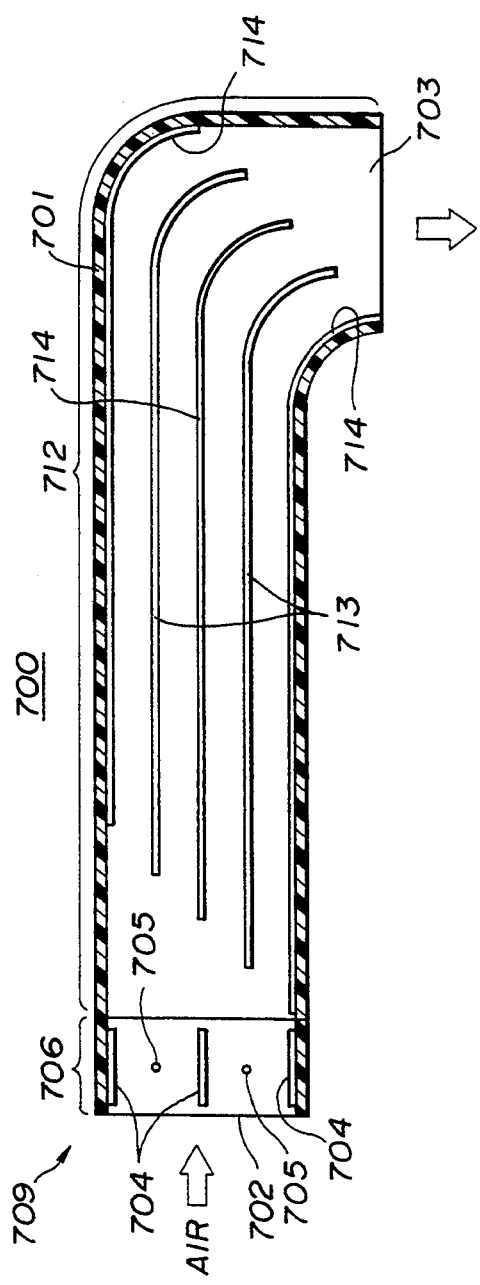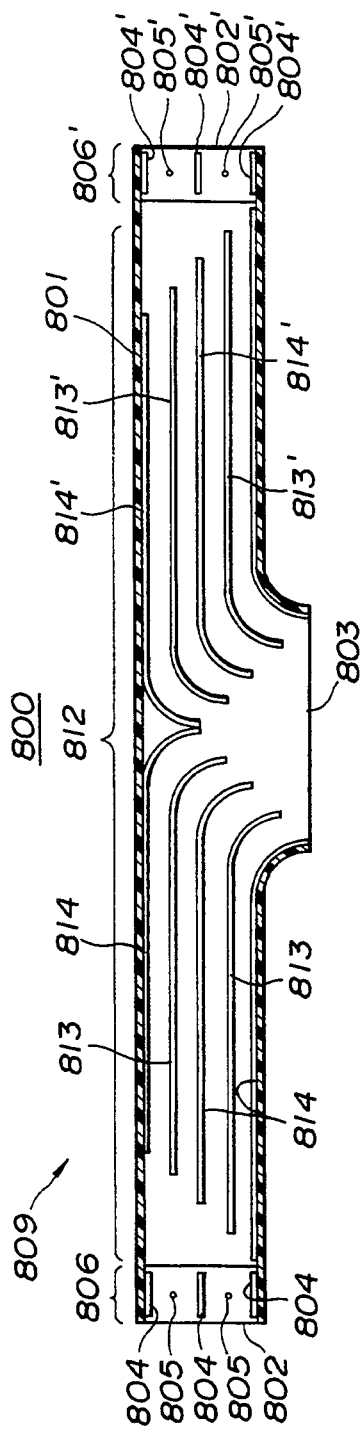

DEVICE FOR CLEANING SURROUNDING AIR FED TO PASSENGER COMPARTMENT OF MOTOR VEHICLE

BACKGROUND OF THE INVENTION

1. Field of the Invention

The present invention relates in general to air cleaning devices for use in a motor vehicle, and more particularly to air cleaning devices of a type which cleans the surrounding air fed to a passenger compartment of the motor vehicle from the outside of the vehicle.

2. Description of the Prior Art

In order to clarify the task of the present invention, one conventional air cleaning device of the above-mentioned type will be described with reference to FIG. 29 of the accompanying drawings.

In FIG. 29, the conventional air cleaning device is shown, which is mounted in a front part of a motor vehicle. That is, the air cleaning device comprises generally an air box 1 which is mounted beneath a cowl top 2 of the vehicle. The cowl top 2 is formed with an air intake opening 3 through which the atmospheric air is introduced into the air box 1. Within the air box 1, there is installed a cowl duct 5 through which the interior of the air box 1 is connected with an air intake case 4. Although not shown in the drawing, the air intake case 4 is led to a passenger compartment of the vehicle through suitable guide ducts. An air filter element 6 constructed of pleated paper is disposed on the cowl duct 5 and an electric air blower 7 is mounted in the air intake case 4. Upon energization of the air blower 7, the atmospheric air in the air box 1 is forced to pass through the air filter 6 and the air thus cleaned is led to the passenger compartment through the guide ducts.

However, due to its inherent construction, the above-mentioned air cleaning device has the following drawbacks and weak points.

First, when the air filter 6 becomes severely blocked or clogged with arrested dust due to long use or the like, the amount of fresh air fed to the passenger compartment is considerably reduced. In particular, in winter, a temporary blocking of the air filter 6 tends to occur due to freezing of moisture in the filter 6. In this case, the passenger compartment is given substantially no fresh air through the air cleaning device. Furthermore, a marked load is applied to the electric air blower 7.

Second, due to the nature of the pleated paper by which the air filter 6 is made, the conventional air cleaning device exhibits a marked air flow resistance. Furthermore, the shape of air flow passage defined in the device is given little thought, which promotes the marked air flow resistance of the device. These induce that high power and thus expensive air blower 7 is necessary for feeding the passenger compartment with a satisfied amount of clean air.

Third, it is very difficult to check and change the air filter element 6. In fact, in the conventional device, for such maintenance, it is necessary to dismantle the entire of the cowl top 2 from the vehicle body.

Fourth, due to the nature of the pleated paper by which the air filter 6 is made, the filter 6 fails to catch very fine particles.

SUMMARY OF THE INVENTION

It is therefore an object of the present invention to provide various types of air cleaning devices for use in a motor vehicle, which can solve the above-mentioned drawbacks.

According to a first aspect of the present invention, there is provided an air cleaning device for use in a motor vehicle having a cowl top and a passenger compartment. The air cleaning device comprises a first structure secured to the cowl top to constitute an air box; a second structure secured to the first structure to constitute an air intake case; first means for defining in the cowl top a first opening through which the interior of the air box and the surrounding air are communicated; second means for defining a second opening through which the interior of the air box and that of the air intake case are communicated; third means for fluidly communicating the interior of the air intake case with the passenger compartment; an air filter holder disposed in the air box at a position above the second opening; an air filter element disposed on the air filter holder; an electric air blower disposed in the air intake case for, upon energization thereof, generating air flow from the first opening to the passenger compartment through the interior of the air box, the air filter element, the second opening, the interior of the air intake case and the third means; and bypass means for producing a bypass passage between the interior of the air box and that of the air intake case bypassing the air filter element when the air filter element is blocked with arrested dusts by a certain degree.

According to a second aspect of the present invention, there is provided an air cleaning device for use in a motor vehicle having a cowl top and a passenger compartment. The air cleaning device comprises a first structure secured to the cowl top to constitute an air box; a second structure secured to the first structure to constitute an air intake case; first means for defining in the cowl top a first opening through which the interior of the air box and the surrounding air are communicated; second means for defining a second opening through which the interior of the air box and that of the intake case are communicated; third means for fluidly communicating the interior of the air intake case with the passenger compartment; a duct installed in the air box, the duct having a mouth portion directed toward the first opening and a tail portion connected with the second opening; an electrostatic dust collecting unit installed in the mouth portion of the duct; an electric air blower disposed in the air intake case for, upon energization, generating air flow from the first opening to the passenger compartment through the interior of the air box, the electrostatic dust collecting unit, the duct, the second opening, the interior of the air intake case and the third means; means for defining in the air intake case a third opening; passage means for communicating the third opening with the passenger compartment; a switch door pivotally connected to the air intake case to selectively open and close the third opening and the second opening; an electric actuator for driving the switch door; and control means which, when an excessive amount of dusts is collected by the electrostatic dust collecting unit, stops the operation of the electrostatic dust collecting unit and at the same time energizes the electric actuator to pivot the switch door to close the second opening and open the third opening.

According to a third aspect of the present invention, there is provided an air cleaning device for use in a motor vehicle having a cowl top and a passenger compartment. The air cleaning device comprises a first structure secured to the cowl top to constitute an air box; a second structure secured to the first structure to constitute an air intake case; first means for defining a first opening through which the interior of the air box and that of the air intake case are communicated; second means for fluidly communicating the interior of the air intake case with the passenger compartment; an air filter holder disposed in the air box at a position above the second opening; an air filter element disposed on the air filter holder; an electric air blower disposed in the air intake case for, upon energization thereof, generating air flow from the interior of the air box to the passenger compartment through the air filter element, the first opening, the interior of the air intake case and the second means; a hood ridge reinforcing structure which extends along a side wall of an engine room of the motor vehicle, the hood ridge reinforcing structure having a communication opening exposed to the interior of the air box; and third means for defining in the hood ridge reinforcing structures an air intake opening which is exposed to the surrounding air.

According to a fourth aspect of the present invention, there is provided an air cleaning device for use in a motor vehicle having a cowl top and a passenger compartment. The air cleaning device comprises a first structure secured to the cowl top to constitute an air box; a second structure secured to the first structure to constitute an air intake case; first means for defining a first opening through which the interior of aid air box and that of the air intake case are communicated; second means for fluidly communicating the interior of the air intake case with the passenger compartment; a hood ridge reinforcing structure which extends along a side wall of an engine room of the motor vehicle, the hood ridge reinforcing structure having a communication opening exposed to the interior of the air box; third means for defining in the hood ridge reinforcing structure an air intake opening which is exposed to the surrounding air; an elongate casing having two inlet openings exposed to the interior of the air box and one air outlet opening connected to the first opening; an electrostatic dust collecting unit installed in the elongate casing; a charcoal filter installed in an air passage positioned downstream of the air outlet opening of the elongate casing; an electric air blower installed in the air intake case for, upon energization thereof, generating air flow from the air intake opening of the hood ridge reinforcing structure to the passenger compartment through the interior of the hood ridge reinforcing structure, the communication opening of the hood ridge reinforcing structure, the interior of the air box, each of the air inlet openings of the elongate casing, the interior of the electrostatic air collecting unit, the charcoal filter and the interior of the air intake case.

According to a fifth aspect of the present invention, there is provided an air cleaning device for use in a motor vehicle having a passenger compartment. The air cleaning device comprises a cowl top structure including a cowl top panel which extends transversely at a rear portion of an engine room of the vehicle, the cowl top panel including a transversely extending front part which faces the engine room and a transversely extending upper part which faces upward; a transversely extending dash upper panel secured to the cowl top panel to constitute an air box; an intake air case connected to the air box; means for fluidly communicating the interior of the intake air case with the passenger compartment; means for defining an air inlet opening through which the surrounding air and the interior of the air box are communicated; means for defining a first opening through which the interior of the air box and that of the intake air case are communicated; means for defining a second opening in the transversely extending upper part of the cowl top panel; a cowl top cover secured to the transversely extending upper part to cover the first opening; means for defining a third opening in the cowl top cover, so that the interior of the air box is viewed from the outside through the second and third openings; a lid detachably connected to the cowl top cover in a manner to cover the third opening; an air filter holder disposed in the air box at a position just above the first opening; an air filter element disposed on the air filter holder; and an electric air blower disposed in the air intake case for, upon energization thereof, generating air flow from the air inlet opening to the passenger compartment through the interior of the air box, the air filter element, the first opening, the interior of the air intake case and the means for communicating the interior of the air intake case with the passenger compartment.

BRIEF DESCRIPTION OF THE DRAWINGS

Other objects and advantages of the present invention will become apparent from the following description when taken in conjunction with the accompanying drawings, in which:

FIG. 12 is a sectioned view of the electrostatic dust collecting nit taken along the line XII—XII of FIG. 10;

FIG. 13 is a view similar to FIG. 11, but showing an electrostatic dust collecting unit employed in a sixth embodiment;

FIG. 14 is a transversely sectioned view of an electrostatic dust collecting unit employed in a seventh embodiment of the present invention;

FIG. 15 is a view similar to FIG. 14, but showing an electrostatic dust collecting unit employed in an eighth embodiment;

DETAILED DESCRIPTION OF THE PREFERRED EMBODIMENTS

Figure 1:
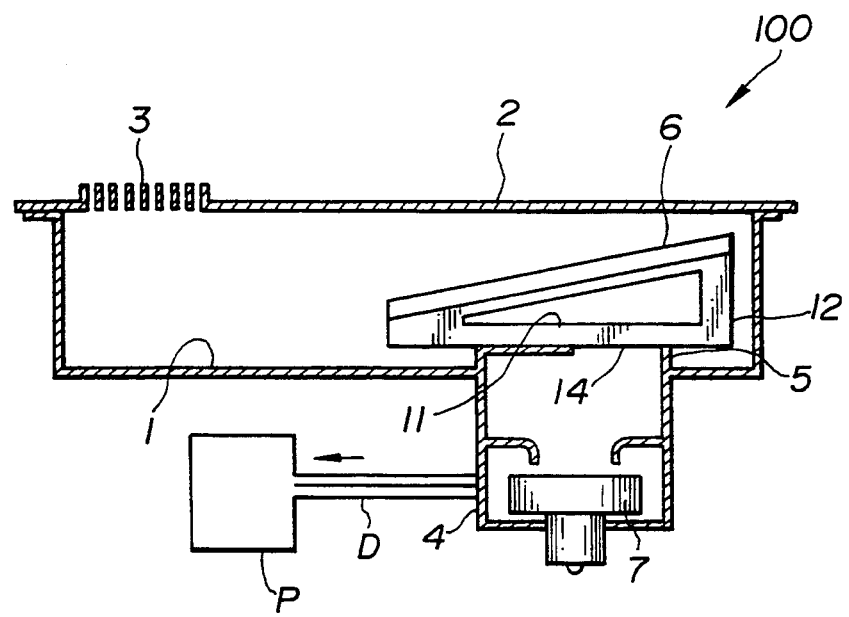
FIG. 1 is a sectional view of an air cleaning device for use in a motor vehicle, which is a first embodiment of the present invention.
Figure 2:
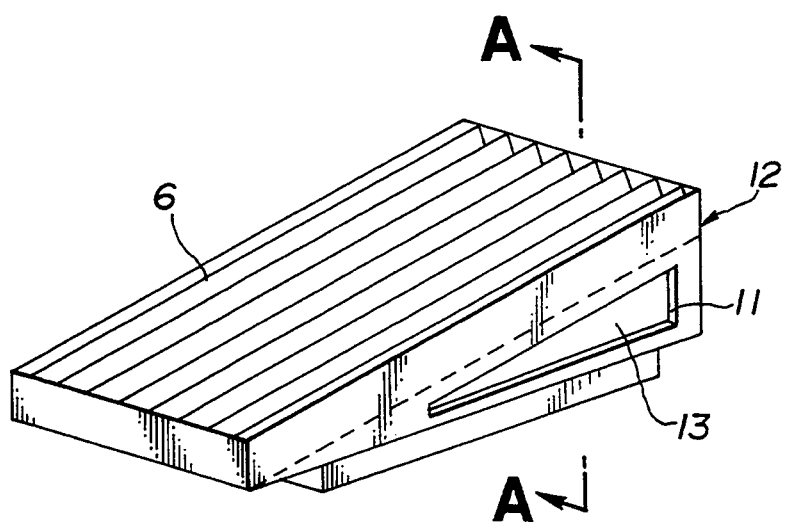
FIG. 2 is a perceptive view of an air filter holder and a pleated paper filter mounted thereon, which are employed in the first embodiment.
Figure 3:
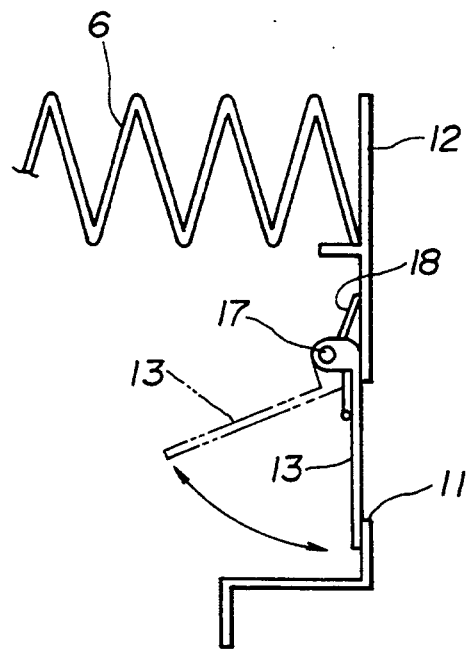
FIG. 3 is a view of a damper door structure for producing a bypass passage, which is used in the first embodiment.

Referring to FIGS. 1 to 3 of the accompanying drawings, there is shown a first embodiment of the present invention.

As is seen from FIG. 1, the air cleaning device 100 of this first embodiment comprises an air box 1 which is mounted beneath a cowl top 2 of a motor vehicle. The cowl top 2 is formed with an air intake opening 3 through which the atmospheric air is introduced into the air box 1.

Within the air box 1, there is installed an air filter holder 12. The air filter holder 12 has an inclined open upper side on which a pleated paper filter 6 (see FIG. 2) is mounted and an open lower side 14 which is mounted on a cowl duct 5 projected into the air box 1. The cowl duct 5 has a downstream part to which an air intake case 4 is integrally connected. As is seen from FIG. 1, the air intake case 4 is led to a passenger compartment "P" of the motor vehicle through suitable air guide ducts "D". An electric air blower 7 is installed in the air intake case 4.

As is seen from FIG. 2, one side wall of the air filter holder 12 is formed with a triangular opening 11 through which the interior of the filter casing 12 is communicated with the exterior of the same.

As is seen from FIG. 3, a triangular damper door 13 is pivotally connected through a pivot pin 17 to an inner wall of the filter casing 12 in a manner to selectively open and close the triangular opening 11. A spring 18 is connected to the damper door 13 to bias the same in a direction to close the triangular opening 11. The arrangement between the damper door 13, the pivot pin 17 and the spring 18 may be understood from FIG. 5.

In the following, operation of the first embodiment 100 will be described.

Upon energization of the electric air blower 7, the atmospheric air is forced to enter the air box 1 through the air intake opening 3 of the cowl top 2, pass through the pleated paper filter 6 and then enter the passenger compartment P through the air guide ducts D. Due to provision of the paper filter 6, the passenger compartment P is given fresh, cleaned or filtered atmospheric air.

While, when, due to long use or the like, the pleated paper filter 6 becomes severely blocked with arrested dust or the frozen moisture in winter, the negative pressure created downstream of the filter 6 becomes marked. Thus, when the negative pressure increases to a certain degree which overcomes the biasing force produced by the spring 18, the damper door 13 is forced to open the triangular opening 11 of the air filter holder 12. In this condition, the atmospheric air is led into the air intake case 4 through the triangular opening 11 bypassing the blocked paper filter 6. That is, the passenger compartment P is given fresh (but not-filtered) atmospheric air.

Figure 4:
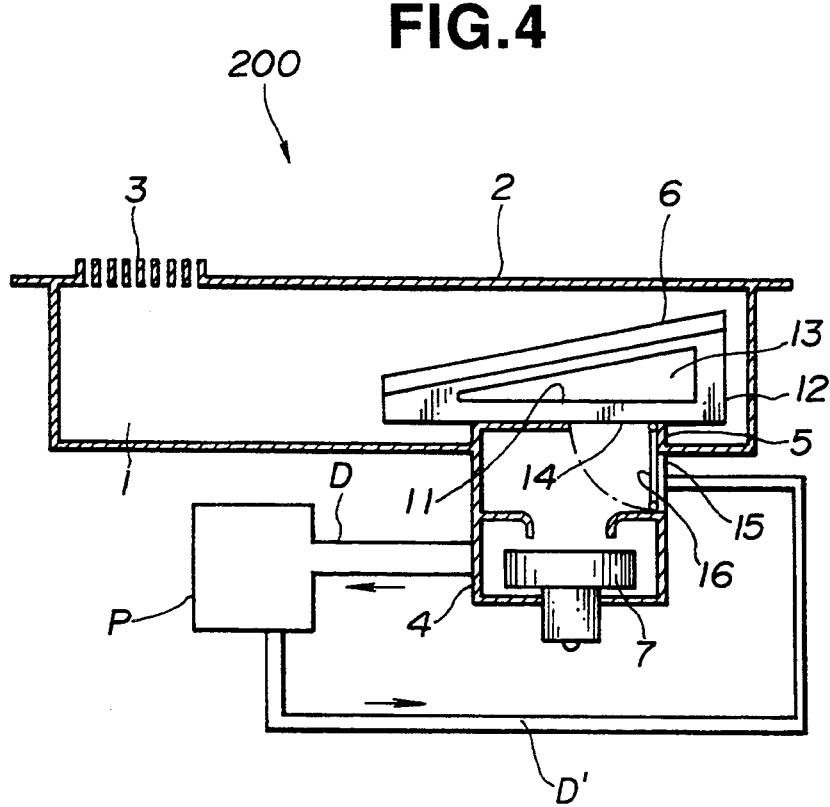
FIG. 4 is a view similar to FIG. 1, but showing a second embodiment.
Figure 5:
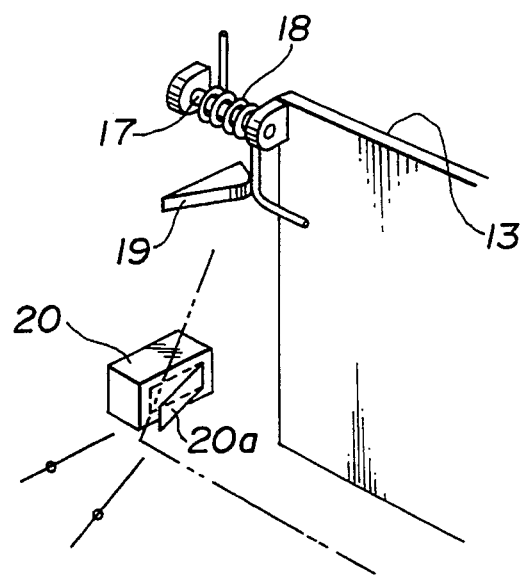
FIG. 5 is a perspective view of some parts used in the second embodiment.

Referring to FIGS. 4 and 5, there is shown a second embodiment of the present invention, which is a slight modification of the first embodiment.

Since the air cleaning device 200 of the second embodiment is similar in construction to the air cleaning device 100 of the above-mentioned first embodiment, only parts and constructions which are different from those of the first embodiment will be described in the following for facilitation of description.

As is seen from FIG. 4, in the second embodiment, the air intake case 4 is formed with an internal air intake opening 15, and a switch door 16 is pivotally connected to the cowl duct 5 in a manner to selectively open and close the open lower side 14 of the air filter holder 12 and the internal air intake opening 15. The internal air intake opening 15 is communicated with the passenger compartment P through a duct D', and a known electric actuator (not shown) is arranged to drive the switch door 16.

As is understood from FIG. 5, a switch 20 is installed in the air filter holder 12. The switch 20 takes OFF (or open) condition when the triangular damper door 13 closes the triangular opening 11 and ON (or closed) condition when the damper door 13 opens the opening 11. That is, the switch 20 has a sensor lever 20a against which the damper door 13 abuts to close the switch 20 when swung inward due to creation of the negative pressure in the air filter holder 12.

Designated by numeral 19 in FIG. 5 is a cam member which is incorporated with one end portion of the spring 18 for providing the damper door 13 with a so-called detent feeling movement. That is, due to sliding engagement between the end portion of the spring 18 and a raised part of the cam member 19, the damper door 13 can keep its closed position (as shown by solid line in the drawing) just before the negative pressure in the filter casing 12 increases to the given degree. Furthermore, the damper door 13 can keep its open position (as shown by phantom line in the drawing) just before the negative pressure reduces to the given degree.

In the following, operation of the second embodiment 200 will be described.

Usually, the switch door 16 closes the internal air intake opening 15. Thus, upon energization of the air blower 7, the passenger compartment is given fresh, cleaned or filtered atmospheric air, like in the case of the above-mentioned first embodiment.

While, when, due to long use or the like, the pleated paper filter 6 becomes severely blocked or clogged with arrested dust or the frozen moisture in winter, the negative pressure created in the air filter holder 12 becomes marked. Thus, when the negative pressure increases to a certain degree which overcomes the biasing force of the spring 18, the damper door 13 is forced to open permitting the end portion of the spring 18 (see FIG. 5) to ride over the raised part of the cam member 19. Thus, for a moment, the atmospheric air is led into the passenger compartment P through the triangular opening 11 bypassing the blocked paper filter 6. When the damper door 13 thus takes the open position, the switch 20 is turned ON. Upon this, the electric actuator (not shown) for the switch door 16 pivots the same to open the internal air intake opening 15 and close the open lower side 14 of the air filter holder 12. Under this condition, atmospheric air is not led into the passenger compartment and only the air in the passenger compartment is forced to circulate therein through the internal air intake opening 15. That is, when the pleated paper filter 6 is severely blocked by arrested dusts, the air cleaning device 200 changes its mode to an internal air circulation mode automatically. Thus, the electric air blower 7 is protected from a marked load.

Figure 6:
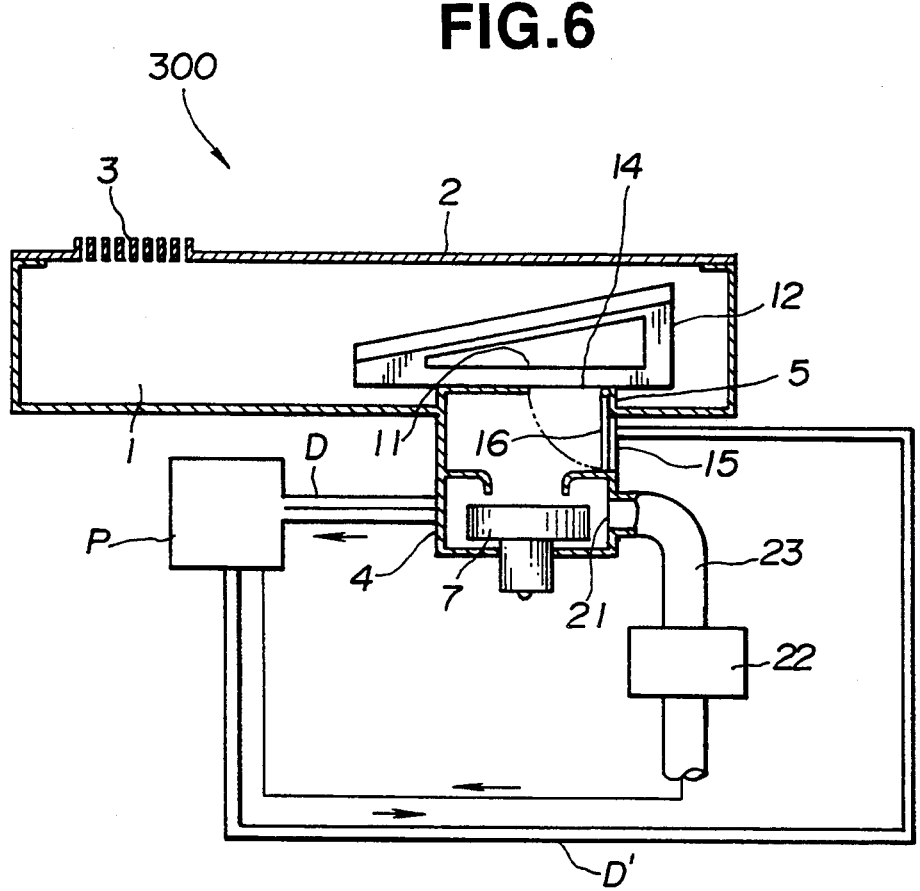
FIG. 6 is a view similar to FIG. 1, but showing a third embodiment.
Figure 7:
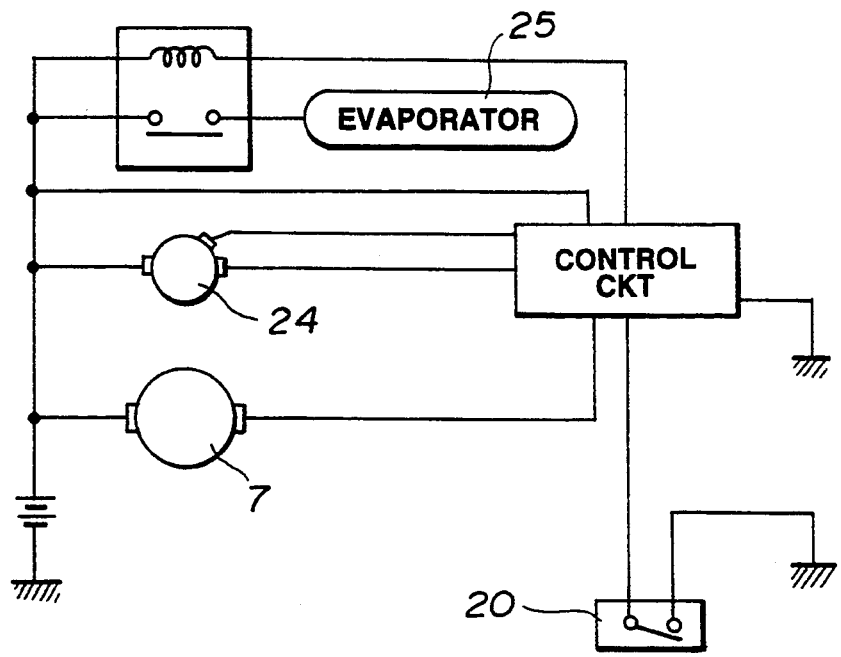
FIG. 7 is an electric circuit employed in the third embodiment.

Referring to FIGS. 6 and 7, there is shown a third embodiment of the present invention, which is a modification of the second embodiment.

Since the air cleaning device 300 of the third embodiment is similar in construction to the air cleaning device 200 of the above-mentioned second embodiment, only parts and constructions which are different from those of the second embodiment will be described in the following.

As is seen from FIG. 6, in the third embodiment, the air intake case 4 is further formed with an air outlet port 21 to which an air inlet duct 23 of an air cooling unit 22 is connected. An air outlet duct (no numeral) from the air cooling unit 22 leads to demister nozzles (not shown) which face a windshield of the vehicle.

As shown in FIG. 7, the air cooling unit 22 comprises an evaporator 25 for cooling air. Designated by numeral 24 is the actuator for the switch door 16.

When the switch door 16 closes the open lower side 14 of the air filter holder 12 causing the air cleaning device 300 to assume the internal air circulation mode, the evaporator 25 is operated to cool and thus dehumidify the air which is fed to the windshield from the air intake case 4. Thus, the windshield can be demisted.

Figure 8:
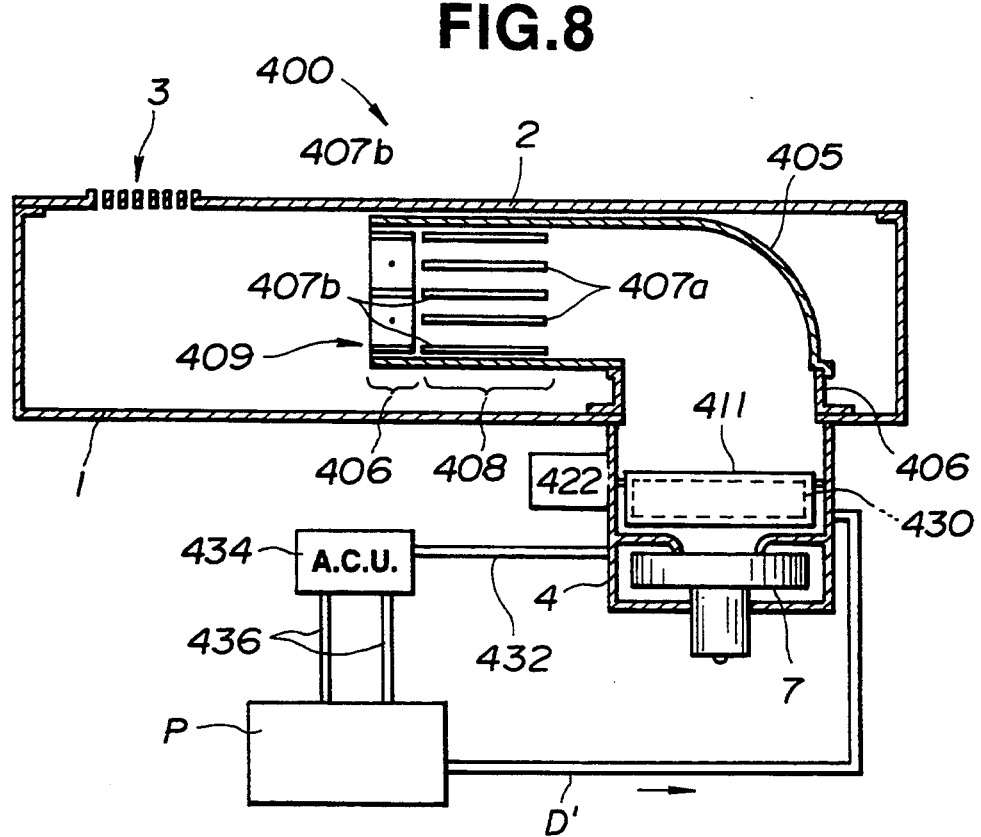
FIG. 8 is a view similar to FIG. 1, but showing a fourth embodiment of the present invention.
Figure 9:
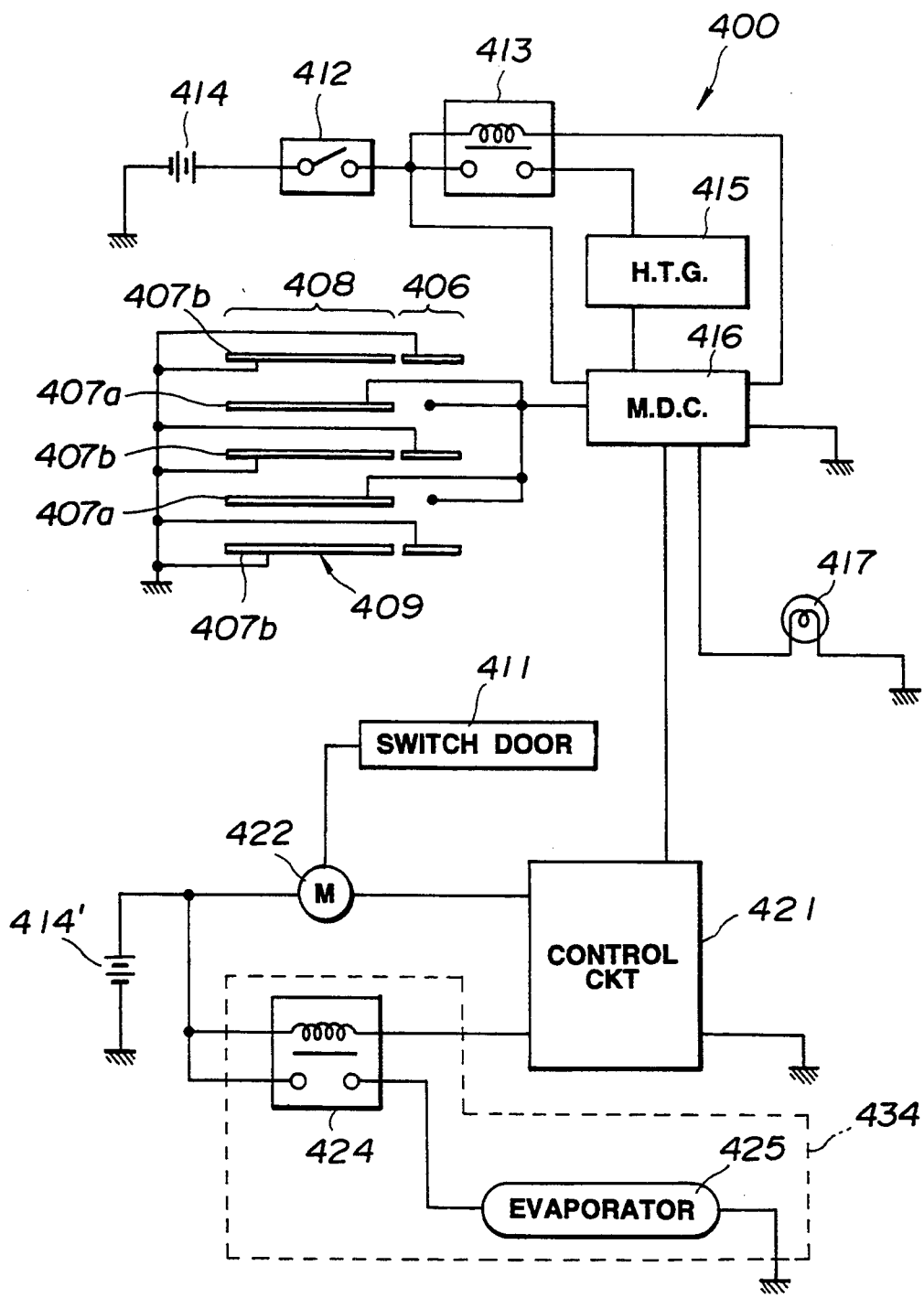
FIG. 9 is an electric circuit employed in the fourth embodiment.

Referring to FIGS. 8 and 9, there is shown a fourth embodiment of the present invention.

As is seen from FIG. 8, the air cleaning device 400 of this fourth embodiment comprises an air box 1 which is mounted beneath a cowl top 2 of a motor vehicle. The cowl top 2 is formed with an air intake opening 3 through which the atmospheric air is introduced into the air box 1.

Within the air box 1, there is installed a duct 405. As shown, the duct 405 has a curved base portion (no numeral) mounted on a holder 406 fixed to the air box 1. The duct 405 has a mouth portion directed upstream toward the air intake opening 3 of the cowl top 2. An air intake case 4 is connected to the air box 1 through the holder 406. Within the air intake case 4, there is installed an electric air blower 7. Designated by numeral 411 is a switch door which corresponds to the switch door 16 of the afore-mentioned second and third embodiments. That is, the air intake case 4 is formed with an internal air intake opening 430 which is connected through air guide ducts D' to suitable portions of the passenger compartment P. The switch door 411 is pivotally moved between an external air induction position wherein, as shown, the internal air intake opening 430 is closed and a passage from the duct 405 to the air blower 7 is opened and an internal air circulation position wherein the internal air intake opening 430 is opened and the passage is closed. Denoted by numeral 422 is an electric actuator for driving the switch door 411.

An air passage 432 extends from the air intake case 4 to an air cooling unit 434 of an air conditioner of the vehicle. Outlet ducts 436 extend from the air cooling unit 434 to various portions of the passenger compartment P. As will be described hereinafter, the air cooling unit 434 comprises an evaporator 425 (see FIG. 9) and a relay 424 controlled by a control circuit 421.

Within the mouth portion of the duct 405, there is installed an electrostatic dust collecting unit 409. The unit 409 comprises generally a dust ionizing part 406 and a dust collecting part 408. The dust collecting part 408 comprises a plurality of positive electrode plates 407a and a plurality of negative electrode plates 407b. These positive and negative electrode plates 407a and 407b are arranged alternately defining certain clearances therebetween.

Thus, when, with the switch door 411 closing the internal air inlet opening 430, both the air blower 7 and the electrostatic dust collecting unit 409 are energized, the atmospheric air is led to the passenger compartment P through the air intake opening 3, the dust collecting unit 409 and the air guide ducts (not shown). During traveling in the duct 405, air dusts (viz., fine particles in air) are collected in the clearances between the positive and negative electrode plates 407a and 407b. Thus, the passenger compartment P is given fresh, cleaned or dust-free atmospheric air.

In FIG. 9, there is shown an electric circuit for the air cleaning device 400 of the fourth embodiment. Denoted by numeral 414 is a DC power source, 412 is a manual switch which is connected to the power source 414, 413 is a relay which is connected to the manual switch 412, 415 is a high tension generator which is connected to the relay 413, 416 is a malfunction detecting circuit which is connected to the relay 413, the high tension generator 415, the manual switch 412 and the positive electrode plates 407a and 417 is a malfunction alarm bulb which is connected to the malfunction detecting circuit 416.

Designated by numeral 421 is a control circuit for controlling both the electric actuator 422 of the switch door 411 and the air cooling unit 434 of the air conditioner. The control circuit 421 receives information signals from the malfunction detecting circuit 416. The electric actuator 422 and the air cooling unit 434 are powered by another electric power source 414'.

In the following, operation of the fourth embodiment 400 of the invention will be described.

For ease of understanding, the description will be commenced with respect to an external air introduction mode of the air cleaning device 400.

Under this condition, the air blower 7 and the dust collecting unit 409 are energized and the switch door 411 assumes the external air induction position as shown in FIG. 8. Thus, as has been described hereinabove, the passenger compartment P of the vehicle is given fresh, cleaned or dust-free atmospheric air. Of course, when the air cooling unit 434 of the air conditioner is kept energized, part of the fresh air fed to the air cleaning device 400 is cooled for conditioning the air in the passenger compartment P.

When, due to long use or the like of the air cleaning device 400, an excessive amount of dusts (or fine particles) is collected in the clearances between the positive and negative electrode plates 407a and 407b of the dust collecting unit 409, the malfunction detecting circuit 416 stops energization of the dust collecting unit 409 and at the same time energizes the malfunction alarm bulb 417 to let the operator (or driver) know the malfunction of the dust collecting unit 409. In fact, when excessive amount of dusts are collected in such clearances, an electric leakage tends to occur, which allows the operation of the malfunction detecting circuit 416.

Upon receiving an information signal representing the malfunction of the air collecting unit 409, the control circuit 421 energizes the actuator 422 to pivot the switch door 411 to the internal air circulation position wherein the internal air intake opening 430 is opened and the passage from the duct 405 to the air blower 7 is closed. Thus, thereafter, the external air is not introduced into the passenger compartment P any longer. That is, only the air in the passenger compartment P is forced to circulate therein through the internal air intake opening 430. Of course, when the air cooling unit 434 of the air conditioner is kept energized, the air is cooled for air conditioning in the passenger compartment P.

In this fourth embodiment, the electrostatic dust collecting unit 409 is employed. Thus, the air flow resistance of the air cleaning device 400 is very small as compared with the air cleaning device which employs a pleated paper filter.

As is described hereinabove, when, in the fourth embodiment, an excessive amount of dusts is collected by the air cleaning device 400, energization of the dust collecting unit 409 is stopped and at the same time the switch door 411 is pivoted to the internal air circulation position shutting off the external air induction passage. That is, under this condition, there is no air flow in the duct 405, more specifically, in the clearances in which the dusts are collected. Thus, it does not occur that the excessive amount of dusts collected by the air collecting unit 409 is removed therefrom and carried into the passenger compartment P.

Figure 10:
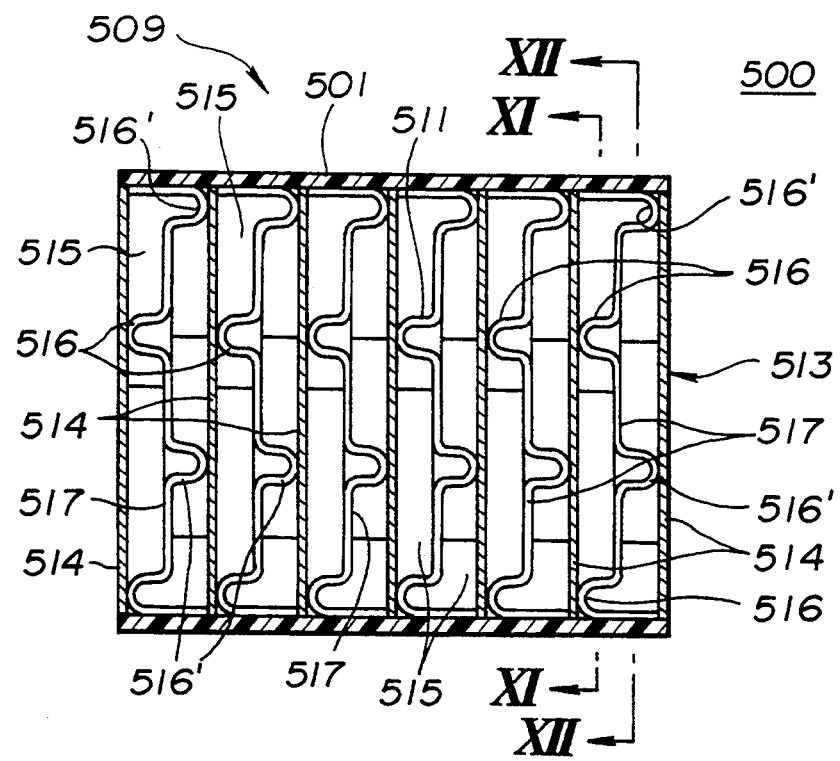
FIG. 10 is a transversely sectioned view of an electrostatic dust collecting unit employed in a fifth embodiment of the present invention.
Figure 11:
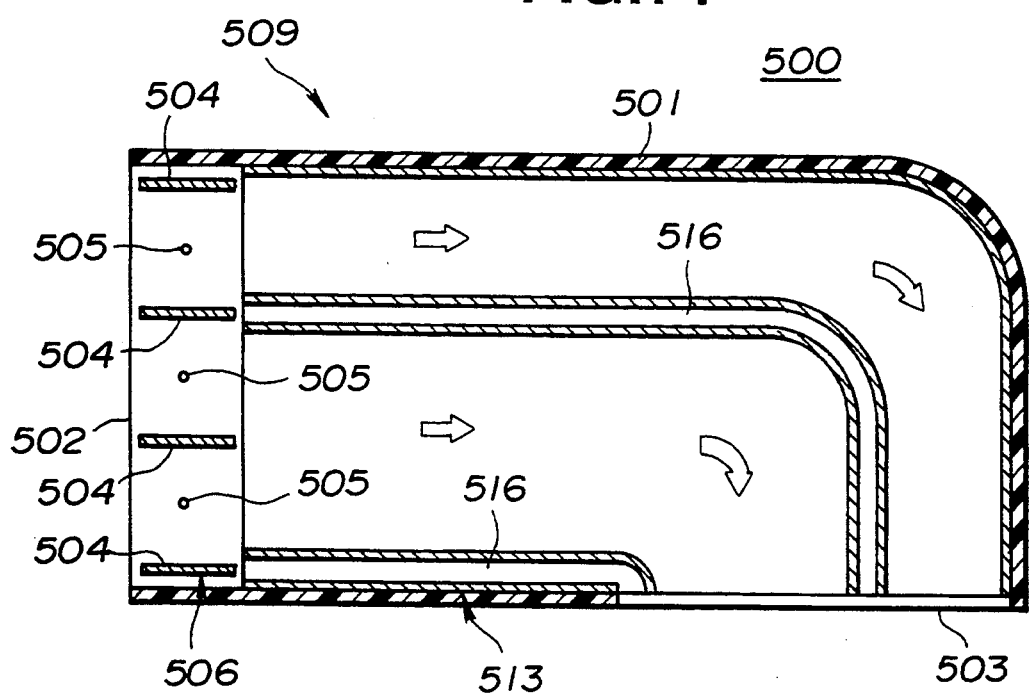
FIG. 11 is a sectioned view of the electrostatic dust collecting unit taken along the line XII—XII of FIG. 10.

Referring to FIGS. 10 to 12, there is shown an electrostatic dust collecting unit 509 which is employed in a fifth embodiment 500 of the present invention. The fifth embodiment 500 is a modification of the above-mentioned fourth embodiment 400.

That is, the fifth embodiment 500 has substantially the same construction as the fourth embodiment 400 of FIG. 8 except for the electrostatic dust collecting unit 409.

Thus, in the following, only the electrostatic dust collecting unit 509 employed in the fifth embodiment 500 will be described with reference to FIGS. 10 to 12 for facilitation of description.

As is seen from these drawings, the electrostatic dust collecting unit 509 comprises an elongate casing 501 constructed of electrically insulating material. The casing 501 has an air inlet portion 502 which is to be directed toward the air inlet opening 3 (see FIG. 8) of the cowl top 2 and an air outlet portion 503 which is to be directed toward the air intake case 4 (see FIG. 8).

As is seen from FIG. 11, within the air inlet portion 502 of the casing 501, there is installed a dust ionizing part 506 which includes a plurality of discharging plates 504 and a plurality of ionizing lines 505. These plates 504 and lines 505 extend transverse to the inlet portion 502 of the casing 501 and are arranged alternately, as shown.

As is understood from FIGS. 10 and 11, within a major portion of the casing 501, there is installed a dust collecting part 513 which comprises a plurality of positive electrode plates 514 and a plurality of negative electrode plates 517. These positive and negative electrode plates 514 and 517 extend in parallel with the longitudinal axis of the casing 501 and are arranged alternately.

As is seen from FIG. 10, each negative electrode plate 517 is formed with two groups of ridges 516 and 516′, one being raised in one direction and the other being raised in the other direction. These ridges 516 and 516′ contact the neighboring positive electrode plates 514 to define therebetween respective clearances in which the dusts in air are to be collected.

As is understood from FIGS. 11 and 12, these two groups of ridges 516 and 516′ are smoothly curved at their rear portions at generally right angles toward the outlet portion 503 of the casing 501. With these curved ridges 516 and 516′, the clearances defined between the neighboring positive and negative electrode plates 514 and 517 make up smoothly curved guide ways for the air which travel therethrough. The flow of air which is smoothly carried out in the guide ways is shown by arrows in FIGS. 11 and 12.

In this fifth embodiment 500, the air flow resistance is much reduced and a compact construction of the air collecting unit 509 is achieved. Furthermore, due to provision of the curved portions of the air guide ways, the dust collecting efficiency of the electrostatic dust collecting unit 509 is increased. That is, during flow in the air guide way, dusts in the air are forced to collide against the perpendicularly standing walls of the positive and negative electrode plates 514 and 517.

Referring to FIG. 13, there is shown an electrostatic dust collecting unit 609 which is employed in a sixth embodiment 600 of the present invention. Also this sixth embodiment 600 is a modification of the above-mentioned fourth embodiment 400 of FIG. 8.

As is seen from the drawing, the electrostatic dust collecting unit 609 comprises an elongate casing 601 constructed of electrically insulating material. The casing 601 is formed at longitudinally opposed ends with two air inlet portions 602 and 602′ and at a middle portion with an air outlet portion 603. Upon assembly of the air cleaning device 600, the air inlet portion 602 is directed toward the air inlet opening 3 (see FIG. 3) of the cowl top 2 and the other air inlet portion 602′ is directed toward another air inlet opening (not shown) which is further formed in the cowl top 2. The air outlet portion 603 is directed toward the air intake case 4 (see FIG. 8).

Within each air inlet portion 602 or 602′ of the casing 601, there is installed a dust ionizing part 606 or 606′ which includes a plurality of discharging plates 604 or 604′ and a plurality of ionizing lines 605 or 605′. These plates 604 or 604′ and lines 605 or 605′ extend transverse to the air inlet portion 602 or 602' and are arranged alternately, as shown.

Within a major portion of the casing 601, there is installed a duct collecting part 613 which comprises a plurality of positive electrode plates and a plurality of negative electrode plates. The positive and negative electrode plates extend in parallel with one another between the two dust ionizing parts 606 and 606' and are arranged alternately.

Similar to the case of the above-mentioned fifth embodiment 500, each negative electrode plate is formed with two groups of ridges 616 and 616', one being raised in one direction and the other being raised in the other direction. These ridges 616 and 616' contact the neighboring positive electrode plates to define therebetween respective clearances in which the dust in air are to be collected.

As is seen from the drawing, these two groups of ridges 616 and 616' are smoothly curved and so shaped that the clearances defined between the neighboring positive and negative electrode plates make up two groups of symmetric air guide ways, each group extending from the corresponding dust ionizing part 604 or 604 toward the common air outlet portion 603. The flow of air which is smoothly carried out in the guide ways is shown by arrows in the drawing.

In this sixth embodiment, the air intake efficiency of the air cleaning device 600 is much increased as compared with the device 500 of the fifth embodiment.

Referring to FIG. 14, there is shown an electrostatic dust collecting unit 709 which is employed in a seventh embodiment 700 of the present invention. Also this seventh embodiment 700 is a modification of the above-mentioned fourth embodiment 400 of FIG. 8.

As is seen from FIG. 14, the electrostatic dust collecting unit 709 comprises an elongate casing 701 constructed of electrically insulating material. The casing 701 has an air inlet portion 702 which is to be directed toward the air inlet opening 3 (see FIG. 8) of the cowl top 2 and an air outlet portion 703 which is to be directed toward the air intake case 4 (see FIG. 8). Inner walls of the casing 701 which define a downstream portion of the interior of the casing 701 are smoothly curved toward the air outlet portion 703.

Within the air inlet portion 702 of the casing 701, there is installed a dust ionizing part 706 which includes a plurality of discharging plates 704 and a plurality of ionizing lines 705. These plates 704 and lines 705 extend transverse to the inlet portion 702 of the casing 701 and are arranged alternately in a manner to define therebetween air guide ways, as shown.

Within a major portion of the casing 701, there is installed a dust collecting part 712 which comprises a plurality of positive electrode plates 713 and a plurality of negative electrode plates 714. These positive and negative electrode plates 713 and 714 extend downward from the dust ionizing part 706 in parallel with the longitudinal axis of the casing 701 and arranged alternately, as shown.

Each of the positive and negative electrode plates 713 and 714 has a rear portion smoothly curved toward the air outlet portion 703 of the casing 701. The outermost and innermost negative electrode plates 714 are put on the smoothly curved inner walls of the casing 701.

Due to provision of the smoothly curved portions of the positive and negative electrode plates 713 and 714 which are directed toward the air outlet portion 703 of the casing 701, the air flow in the dust collecting unit 700 is smoothed thereby reducing the air flow resistance of the unit 700. Furthermore, due to provision of such smoothly curved portions of the positive and negative electrode plates 713 and 714, the dust collecting efficiency of the electrostatic dust collecting unit 709 for the same reason as is mentioned in the part of the fifth embodiment.

Referring to FIG. 15, there is shown an electrostatic dust collecting unit 809 which is employed in an eighth embodiment 800 of the present invention.

The electrostatic dust collecting unit 809 comprises an elongate casing 801 constructed of electrically insulating material. The casing 801 is formed at longitudinally opposed ends with two air inlet portions 802 and 802' and at a middle portion with an air outlet portion 803. Upon assembly of the air cleaning device 800, the air inlet portion 802 is directed toward the air inlet opening 3 (see FIG. 3) of the cowl top 2 and the other air inlet portion 802' is directed toward another air inlet opening (not shown) which is further formed in the cowl top 2. The air outlet portion 803 is directed toward the air intake case 4 (see FIG. 8).

Within each air inlet portion 802 or 802' of the casing 801, there is installed an ionizing part 806 or 806' which includes a plurality of discharging plates 804 or 804' and a plurality of ionizing lines 805 or 805'. These plates 804 or 804' and lines 805 or 805' extend transverse to the air inlet portion 802 or 802' and are arranged alternately as shown.

Within a major portion of the casing 801, there is installed a dust collecting part 812 which comprises a plurality of positive electrode plates 813 and 813' and a plurality of negative electrode plates 814 and 814'. As shown, these electrode plates 813, 813', 814 and 814' are grouped into two, one being the group which consists of the electrode plates 813 and 814 extending from the dust ionizing part 806 to the air outlet portion 803 of the casing 801 and the other being the group which consists of the electrode plates 813' and 814' extending from the dust ionizing part 806' to the air outlet portion 803. The positive and negative electrode plates 813 and 814 (or, 813' and 814') extend in parallel with one another and with the longitudinal axis of the case 801 and are arranged alternately.

As shown, the positive and negative electrode plates of each group has rear portions smoothly curved toward the air outlet portion 803 of the casing 801. The outermost and innermost negative electrode plates 814 and 814' are put on inner walls of the casing 801.

In this eighth embodiment, the air intake efficiency of the air cleaning device 800 is much increased as compared with the device 700 of the seventh embodiment.

Figure 16:
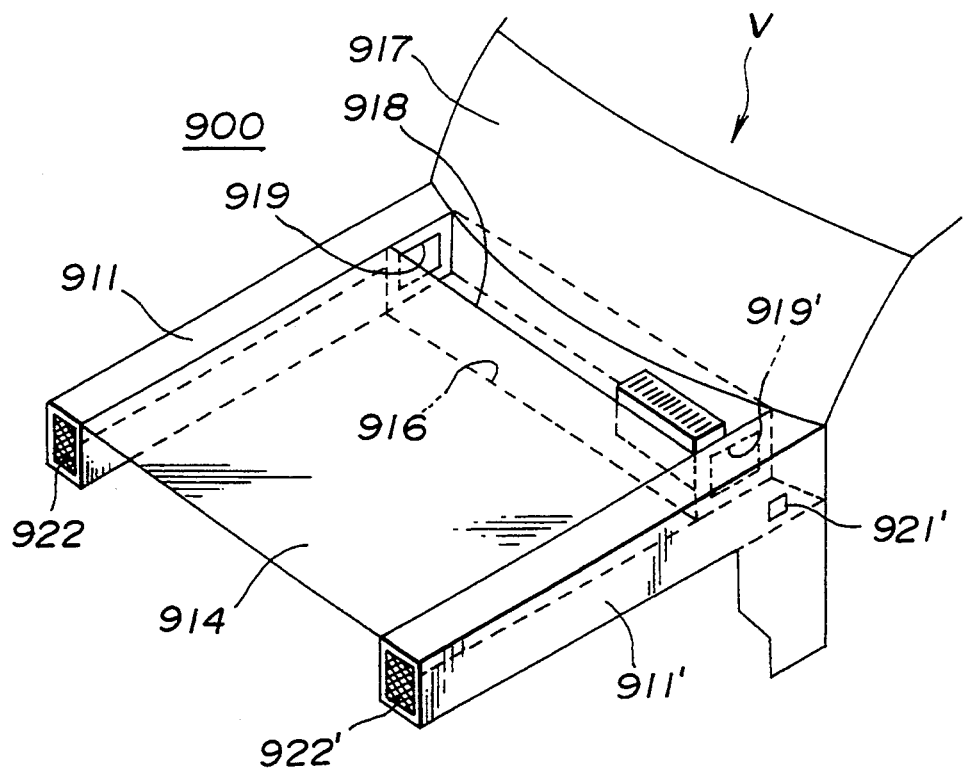
FIG. 16 is a schematically illustrated front view of a motor vehicle, showing a cowl top structure and two hood ridge reinforcing hollowed structures which are employed in a ninth embodiment of the present invention.
Figure 17:
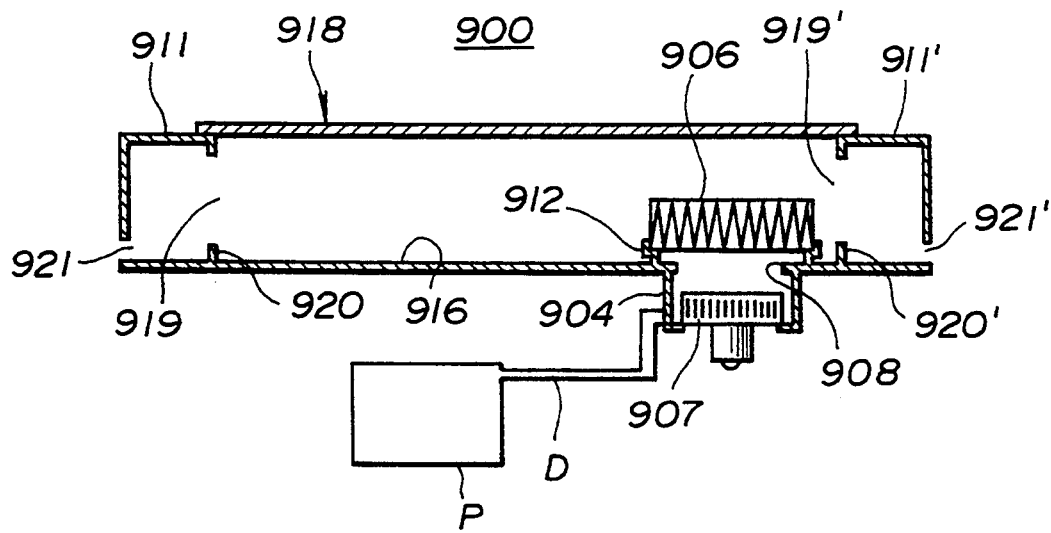
FIG. 17 is a sectional view similar to FIG. 1, but showing the ninth embodiment.
Figure 18:
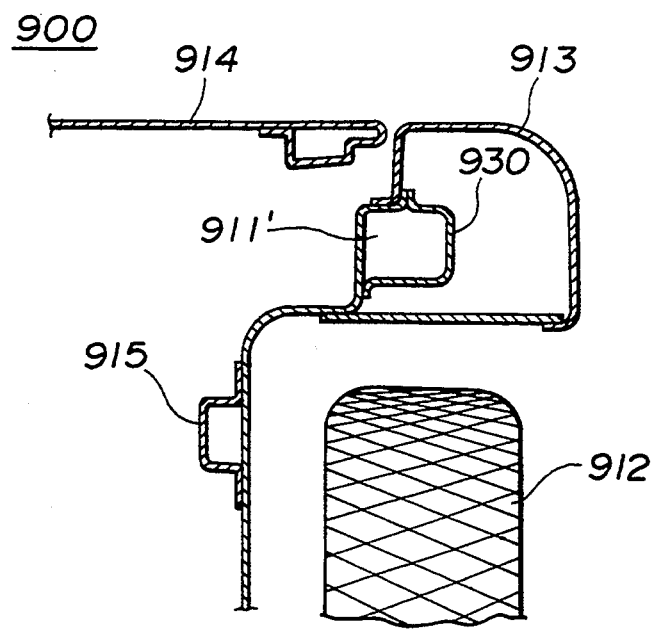
FIG. 18 is a sectional view of a portion of the vehicle where a front left tire is positioned.

Referring to FIGS. 16 to 18, there is shown an air cleaning device 900 of a ninth embodiment of the present invention.

As is seen from FIGS. 16 and 17, the air cleaning device 900 of this embodiment comprises an air box 916 which is mounted beneath a cowl top 918 of a motor vehicle "V". As is seen from FIG. 16, the air box 916 extends transversely at a rear portion of an engine room of the vehicle "V". Denoted by numeral 914 is a hood for the engine room and denoted by numeral 917 is a windshield of the vehicle "V".

Denoted by numerals 911 and 911' are hood ridge reinforcing hollowed structures which extend along side walls of the engine room.

As is seen from FIG. 18, each reinforcing hollowed structure 911' or 911 is constructed by securing a separate elongate channel member 930 to a front fender 913 of the vehicle "V". Denoted by numeral 912 is a front left tire (as viewed by a driver) and denoted by 915 is a side reinforcing member which is secured to an inner wall of the front fender 913.

As is seen from FIGS. 16 and 17, the transversely elongated air box 916 has both ends which are opened and mated with openings 919 and 919′ formed in the respective reinforcing hollowed structures 911 and 911′. Each hollowed structure 911 or 911′ has an open front end covered with a metal mesh 922 or 922′. Thus, the interior of the air box 916 is communicated with the atmosphere through two air intake ways, one including the opening 919, the interior of the hollowed structure 911 and the front open end 922, and the other including the opening 919′, the interior of the hollowed structure 911′ and the front open end 922′.

As is seen from FIG. 17, within the air box 916, there is provided an air filter holder 912 which is mounted above an opening 908 formed in a lower wall of the air box 916. The air filter holder 12 has an upper open side on which a pleated paper filter 906 is mounted.

An air intake case 904 is connected to the lower wall of the air box 916 to communicate with the opening 908. The air intake case 904 is led to a passenger compartment P of the vehicle "V" through suitable air guide ducts D. An electric air blower 907 is installed in the air intake case 904.

As is seen from FIG. 17, each of the reinforcing hollowed structures 911 or 911′ is formed at a lower portion with a water draining opening 921 or 921′ through which foreign water is to be discharged to the outside. In order to prevent such foreign water from entering the air box 916, water stoppers 920 and 920′ are provided by inner walls of the reinforcing hollowed structures 911 and 911′. In fact, when the vehicle "V" is being washed, water tends to enter the hollowed structures 911 and 911′ from the front open ends.

When, in operation, the electric air blower 907 is energized, the atmospheric air is fed to the air box 916 through the two air intake ways. This means a marked reduction in air flow resistance of the air cleaning device 900. Thus, a satisfied amount of fresh air can be given to the passenger compartment.

Figure 19:
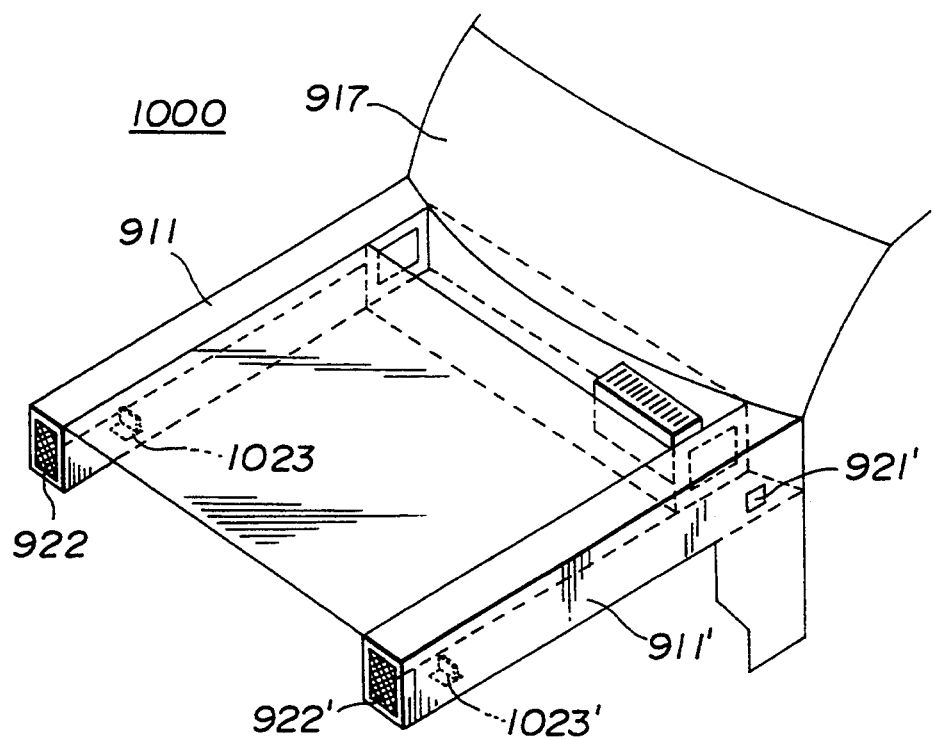
FIG. 19 is a view similar to FIG. 16, but showing a cowl top structure and two hood ridge reinforcing hollowed structures which are employed in a tenth embodiment of the present invention.
Figure 20:
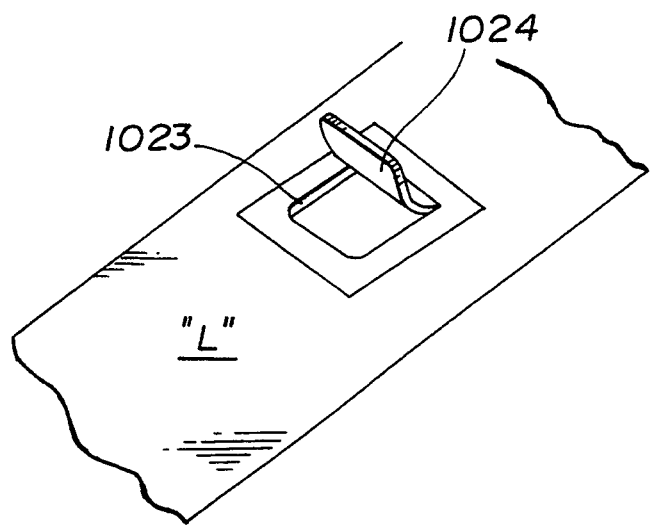
FIG. 20 is a perspective view of an additional water drain opening employed in the tenth embodiment.
Figure 21:
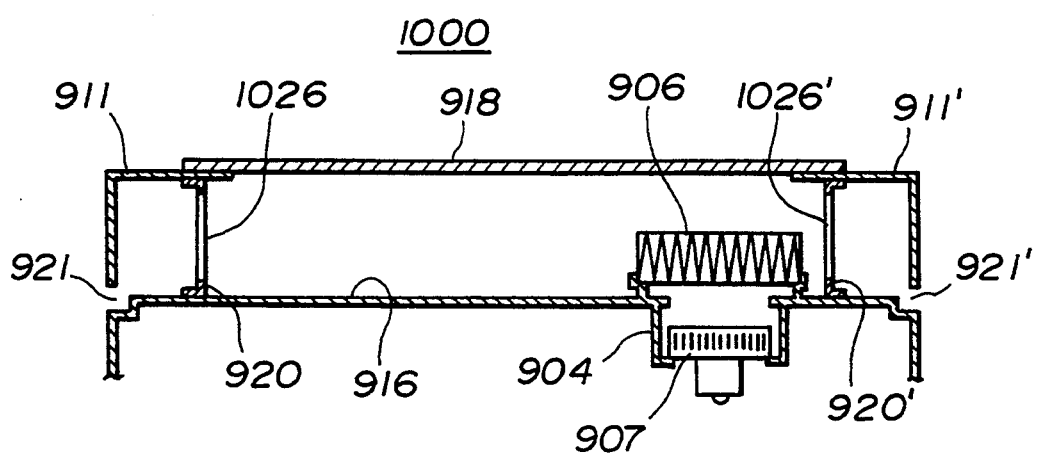
FIG. 21 is a sectional view similar to FIG. 1, but showing the tenth embodiment.

Referring to FIGS. 19 to 21, there is shown an air cleaning device 1000 of a tenth embodiment of the present invention.

Since this tenth embodiment 1000 is similar to the above-mentioned ninth embodiment 900, only parts and constructions which are different from those of the ninth embodiment will be described and the same parts as those of the ninth embodiment 900 will be noted by the same numerals.

As is seen from FIG. 19, in this tenth embodiment 1000, an additional opening 1023 or 1023′ is formed in a front portion of each reinforcing hollowed structure 911 or 911′ for the purpose of water draining. As is seen from FIG. 20, the opening 1023 or 1023′ is provided by pressing out and raising a part 1024 of a lower wall "L" of the structure 911 or 911′. The raised part 1024 extends from a rear end of the opening 1023 or 1023′.

Furthermore, as is seen from FIG. 21, the drain opening 921 or 921′ formed in each reinforcing hollowed structure 911 or 911′ has a bottom which is lower than the lower wall "L" of the structure 911 or 911′. Denoted by numerals 1026 and 1026′ are apertured panels which are fixed to the longitudinal both ends of the elongated air box 916.

Due to provision of the two uniquely shaped openings 921 and 1023 (or, 912′ and 1023′) in each reinforcing hollowed structure 911 or 911′, the water draining from the structure 911 or 911′ is much effectively carried out.

Figure 22:
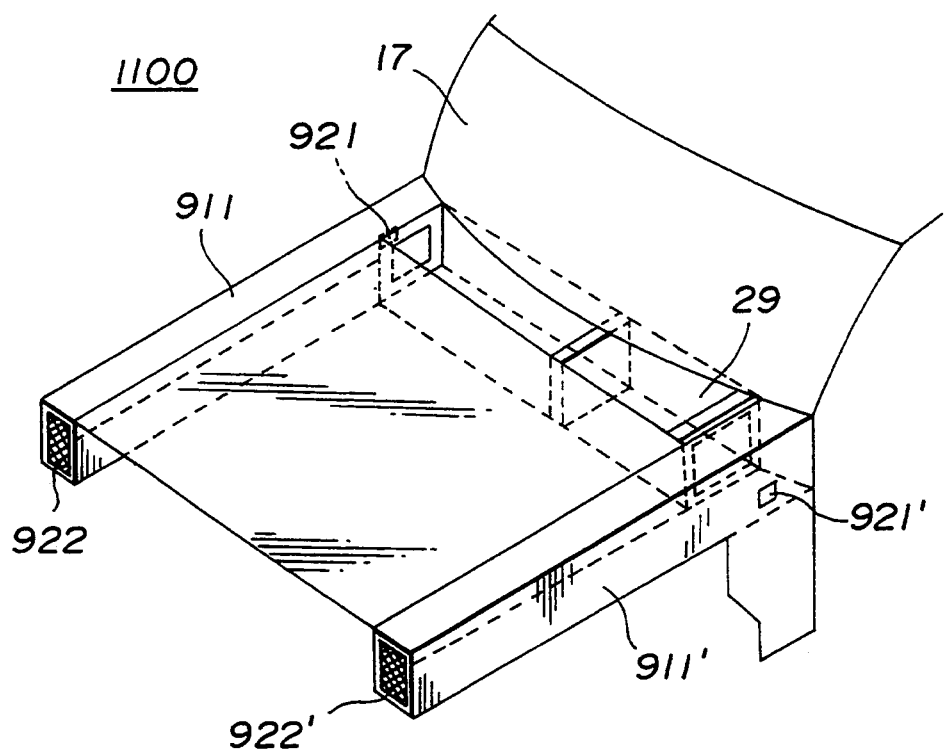
FIG. 22 is a view similar to FIG. 16, but showing a cowl top structure and two hood ridge reinforcing hollowed structures which are employed in an eleventh embodiment of the present invention.
Figure 23:
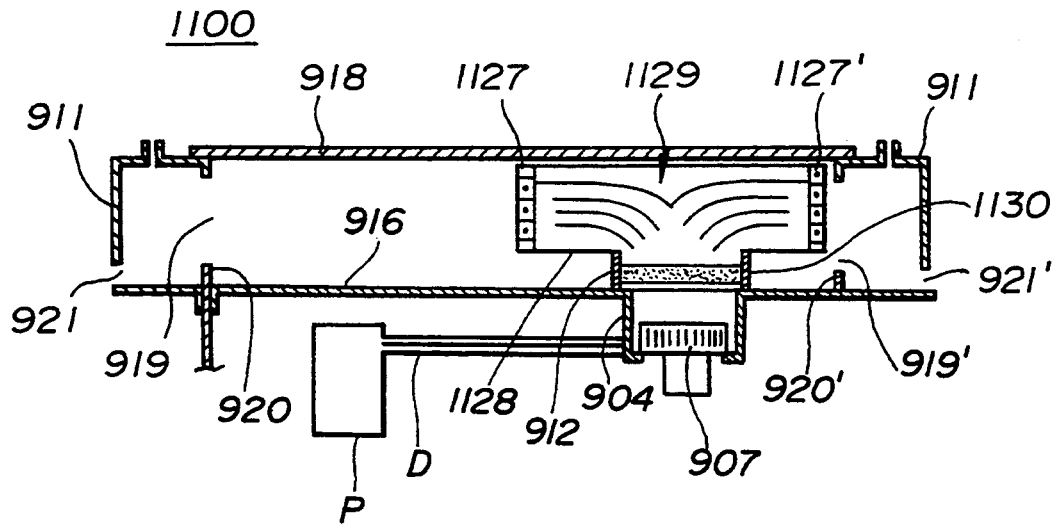
FIG. 23 is a sectional view similar to FIG. 1, but showing the eleventh embodiment.

Referring to FIGS. 22 and 23, there is shown an air cleaning device 1100 which is an eleventh embodiment of the present invention.

Since this embodiment is similar to the above-mentioned ninth embodiment 900, only parts and constructions which are different from those of the ninth embodiment will be described and the same parts as those of the ninth embodiment 900 will be denoted by the same numerals.

As is seen from FIG. 23, in this eleventh embodiment 1100, an electrostatic dust collecting unit 1129 is installed in the air box 916. The dust collecting unit 1129 comprises an elongate casing, two dust ionizing parts 1127 and 1127′ installed in longitudinal open ends of the casing and a dust collecting part 1128 installed in a major portion of the casing.

The dust ionizing parts 1127 and 1127′ are directed toward the openings 919 and 919′ of the reinforcing hollowed structures 911 and 911′.

The dust collecting unit 1129 may be the type of the afore-mentioned unit 600 of FIG. 13 or the unit 800 of FIG. 16.

An air outlet portion of the dust collecting unit 1129 is disposed on a filter holder 912 by which a charcoal filter 1130 is held. An air intake case 904 and an electric air blower 907 are connected to the air box 916 in the same manner as the afore-mentioned ninth embodiment.

In this eleventh embodiment 1100, the following advantages are obtained.

Due to usage of the two air induction passages 911 and 911′, satisfied amount of fresh air can be given to the passenger compartment P.

Due to usage of the electrostatic dust collecting unit 1129, very fine particles can be removed from the air fed to the passenger compartment P.

Due to usage of the charcoal filter 1130, bad smell can be removed from the air fed to the passenger compartment.

Figure 24:
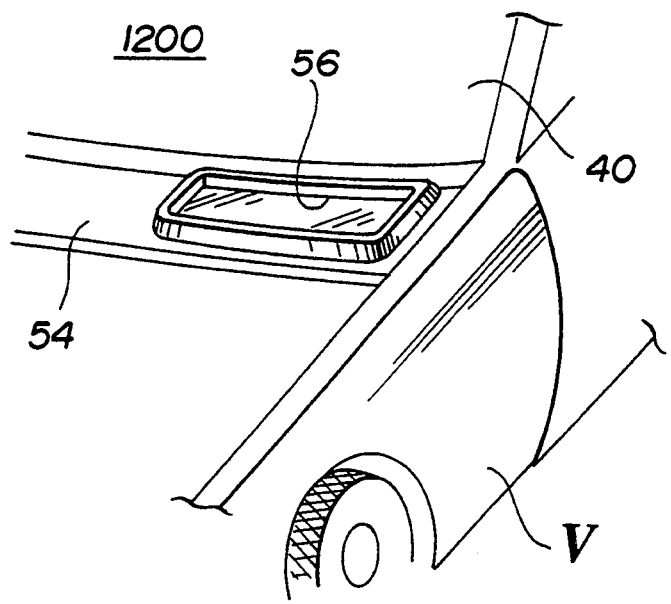
FIG. 24 is a schematically illustrated front view of a motor vehicle showing a cowl top structure which is employed in a twelfth embodiment of the present invention.
Figure 25:
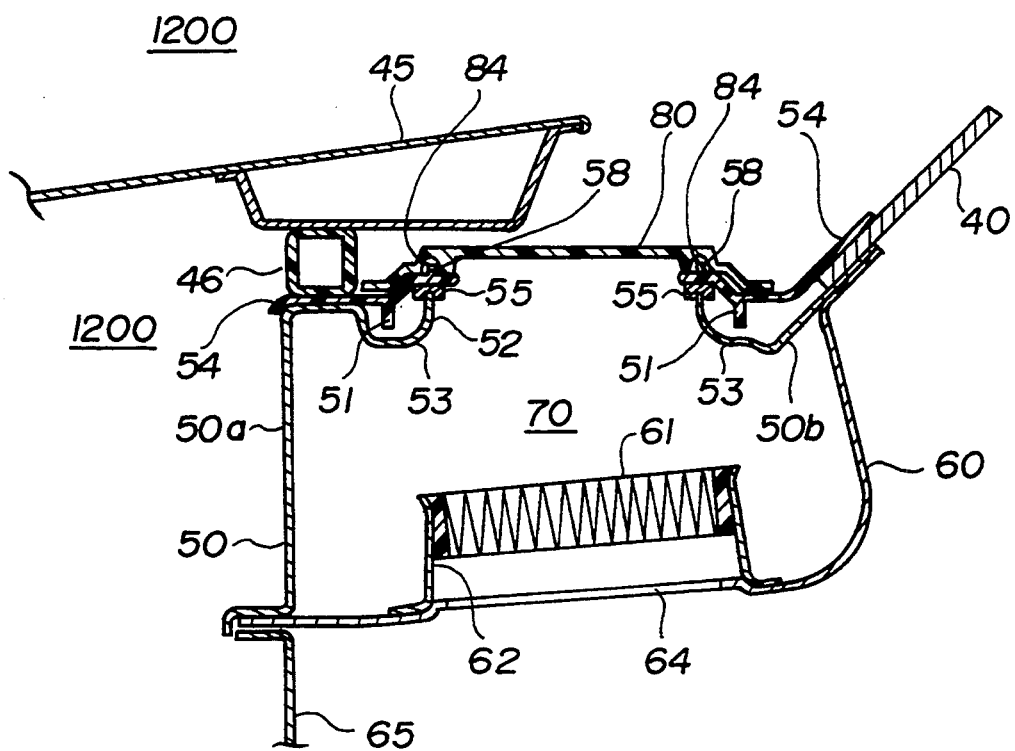
FIG. 25 is a sectional view of a cowl top structure of the vehicle, showing various parts employed in the twelfth embodiment.
Figure 26:
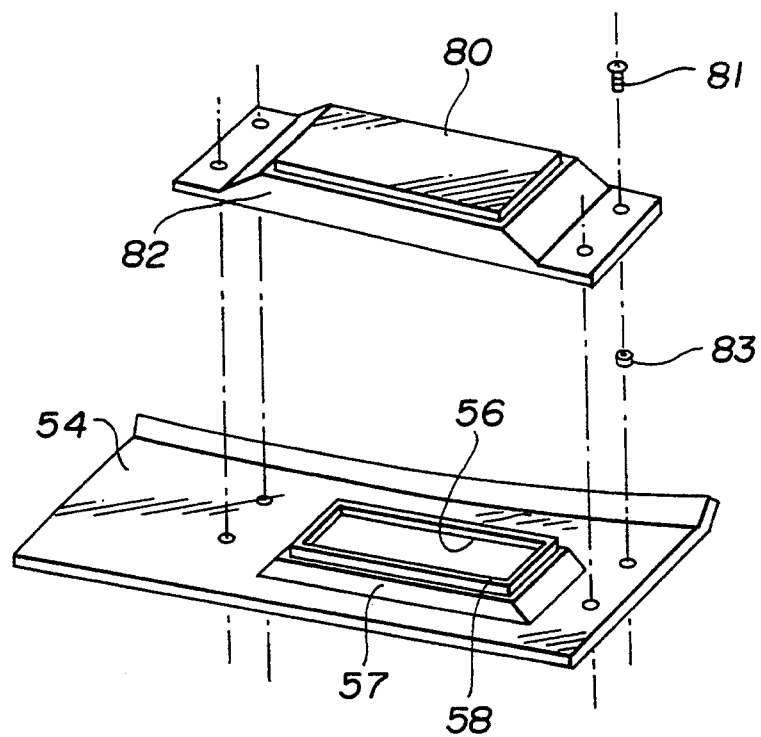
FIG. 26 is a perspective view of a cowl top cover and a lid which are employed in the twelfth embodiment.

Referring to FIGS. 24 to 28, particularly FIGS. 24 to 26, there is shown an air cleaning device 1200 which is a twelfth embodiment of the present invention.

As will become apparent as the description proceeds, in this twelfth embodiment, an inspection aperture, which is usually covered with a lid, is formed in a cowl top structure for facilitating inspection of an air filter installed in an air box.

In FIG. 25, there is shown a cowl top structure to which the twelfth embodiment 1200 of the present invention is practically applied. Denoted by numeral 40 is a windshield of a motor vehicle which is denoted by reference "V" in FIG. 24. Denoted by numeral 45 in FIG. 25 is a hood for an engine room. When the hood 45 is properly put on the engine room, a rubber seal 46 is compressed for achieving a sealing therebetween.

As is best shown in FIG. 25, the cowl top structure comprises a cowl top panel 50 which extends transversely at a rear portion of the engine room. The cowl top panel 50 includes a transversely extending front part 50a which faces the engine room and a transversely extending upper part 50b which faces upward. A transversely extending dash upper panel 60 is secured to the cowl top panel 50 to constitute an air box 70 as shown. Although not shown in the drawings, an air intake opening is provided in the upper part 50b of the cowl top panel 50 to establish a communication between the surrounding air and the interior of the air box 70.

The upper part 50b of the cowl top panel 50 is formed with a rectangular opening 52. The opening 52 is surrounded by a rectangular gutter 53 defined by the upper part 50b. The rectangular opening 52 is covered by a rectangular cowl top cover 54 (see FIG. 26) which is secured to the upper part 50b of the cowl top panel 50 by means of bolts or the like. The cowl top cover 54 is formed with a rectangular wall 51 which projects into the gutter 53 to serve as a water stopper. The cowl top cover 54 may be constructed of a plastic. For achieving a watertight sealing, a seal member 55 is disposed between a raised peripheral edge of the opening 52 and the cover 54.

Within the air box 70, there is installed an air filter holder 62 which is secured to the dash upper panel 60. A pleated paper filter 61 is held by the air filter holder 62. The dash upper panel 60 is formed below the filter 61 with an opening 64 which is exposed to an air intake case 65. Although not shown in the drawing, an electric air blower is installed in the air intake case 65 to enforcedly carry filtered atmospheric air into the passenger compartment P through air guide ducts like in the case of the above-mentioned embodiments.

Figure 27:
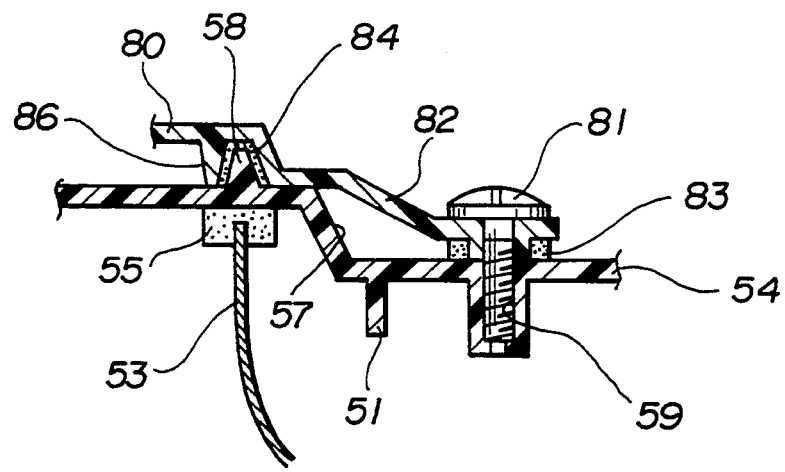
FIGS. 27 and 28 are sectional views showing the methods for detachably connecting the lid to the cowl top cover.

As is seen from FIG. 26, the rectangular cowl top cover 54 is formed with a rectangular inspection aperture 56 which is rimmed by a rectangular bank 57. The inspection aperture 56 is so sized as to permit insertion of hands of an operator. On and around the rectangular bank 57, there extends a ridge 58 which has a generally triangular cross section as shown in FIG. 27. Preferably, the inspection aperture 56 is positioned just above the air filter 61 for ease with which the air filter 61 is handled by an operator.

As is seen from FIG. 26, a rectangular lid 80 is secured through bolts 81 to the cowl top cover 54 to sealingly cover the inspection aperture 56. Denoted by numeral 83 is a seal bush which is to be compressed between the cowl top cover 54 and the lid 80.

The lid 80 has a rectangular bank portion 82 which is sized and shaped to mate with the bank 57 of the inspection aperture 56.

As is seen from FIG. 25, the lid 80 is formed at its depressed inner wall with a rectangular groove 84. Upon assembly of the lid 80, the ridge 58 of the inspection aperture 56 is intimately put into the groove 84 to achieve a tight connection between the cowl top cover 54 and the lid 80. As is seen from FIG. 27, a seal member 86, such as polyurethane foam or the like, is disposed between the ridge 58 and the groove 84.

Figure 28:
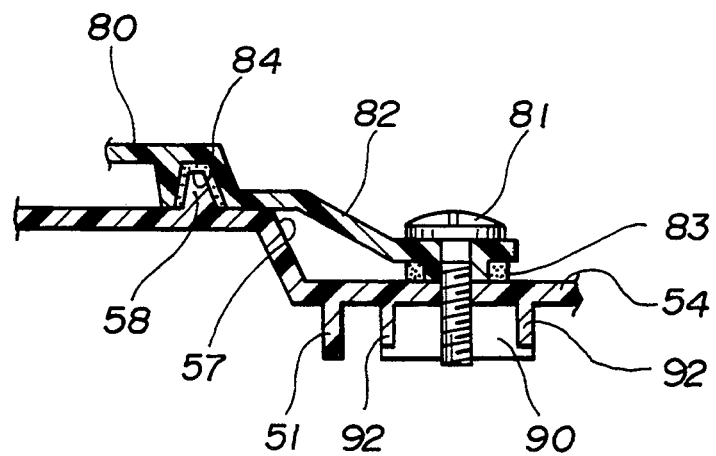
Figure 29:
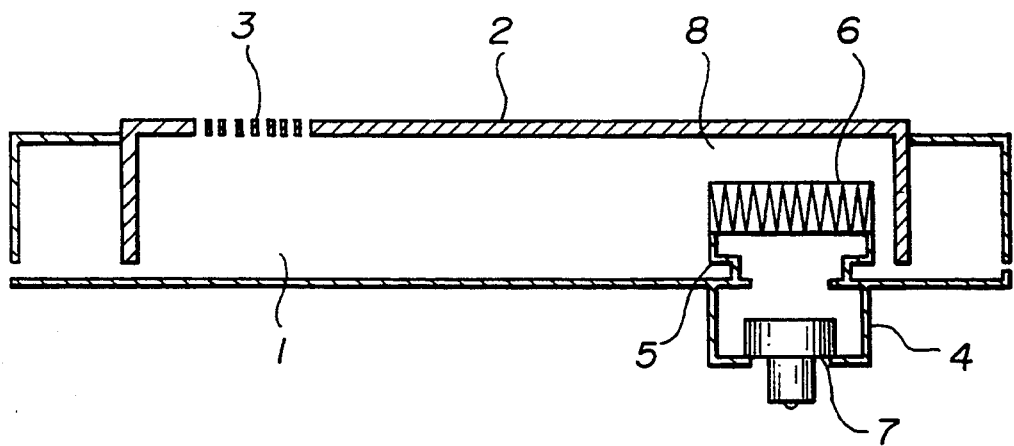
FIG. 29 is a view similar to FIG. 1, but showing a conventional air cleaning device.

FIGS. 27 and 28 show methods for securing the lid 80 to the cowl top cover 54 by using the bolts 81. In the method of FIG. 27, the cowl top cover 54 is formed with threaded openings 59 into which the bolts 81 are screwed. In the method of FIG. 28, nuts 90 are used which are fixed to a back surface of the cowl top cover 54 by means of flanges 92 which are defined by the cowl top cover 54. The bolts 81 are engaged with the nuts 90, as shown.

Usually, the rectangular lid 80 is secured to the cowl top cover 54 to block up the inspection aperture 56. Thus, when, in operation, the electric air blower (not shown) installed in the air intake case 65 (see FIG. 25) is energized, atmospheric air is led into the air box 70 through the air intake opening (not shown), then cleaned by the air filter 61 and then fed to the passenger compartment P through the air guide ducts (not shown), like in the above-mentioned embodiments.

While, when inspection of the air filter 61 becomes necessary, the lid 80 is removed by loosening the bolts 81. With this, an operator can easily inspect and handle the air filter 61 through the inspection aperture 56.

What is claimed is:

1. An air cleaning device for use in a motor vehicle having an engine room, a cowl top structure, a dash upper panel and a passenger compartment, said air cleaning device comprising:
    an air box comprising said cowl top structure and said dash upper panel;
    first means providing a fluid communication between the interior of said air box and the surrounding air;
    second means providing a fluid communication between the interior of said air box and the passenger compartment;
    an air filter holder positioned in said air box;
    an air filter element detachably held by said air filter holder, so that the air directed from said air box to the passenger compartment through said second means is filtered by said air filter element;
    third means defining in an upper part of said cowl top structure an opening;
    a cowl top cover secured to said upper part of said cowl top structure to cover the opening of said cowl top structure;
    fourth means defining in said cowl top cover an inspection aperture which is positioned above said air filter holder; and
    a lid detachably connected to said cowl top cover in a manner to cover said inspection aperture.

2. An air cleaning device as claimed in claim 1, further comprising an intake air case which is mounted beneath said air box and comprises a part of said second means.

3. An air cleaning device as claimed in claim 2, further comprising an electric air blower which is positioned in said intake air case for, upon energization thereof, forcing the air in the air box to move toward the passenger compartment through said air filter element and said second means.

4. An air cleaning device as claimed in claim 3, in which said inspection aperture is so sized as to permit insertion of hands of an operator thereinto.

5. An air cleaning device as claimed in claim 4, in which said cowl top cover and said lid are constructed of plastics.

6. An air cleaning device as claimed in claim 5, in which said lid is secured to said cowl top cover by means of bolts.

7. An air cleaning device for use in a motor vehicle having a passenger compartment, comprising:
    a cowl top structure including a cowl top panel which extends transversely at a rear portion of an engine room of the vehicle, said cowl top panel including a transversely extending front part which faces the engine room and a transversely extending upper part which faces upward;
    a transversely extending dash upper panel secured to said cowl top panel comprising an air box;
    an intake air case connected to said air box;
    means for fluidly communicating the interior of said intake air case with the passenger compartment;
    means for defining an air inlet opening through which the surrounding air and the interior of said air box are communicated;

means for defining a first opening through which the interior of said air box and that of said intake air case are communicated;

means for defining a second opening in said transversely extending upper part of said cowl top panel;

a cowl top cover secured to said transversely extending upper part to cover said second opening;

means for defining a third opening in said cowl top cover, so that the interior of said air box is viewed from the outside through said second and third openings;

a lid detachably connected to said cowl top cover in a manner to cover said third opening;

an air filter holder positioned in said air box at a position just above said first opening;

an air filter element positioned on said air filter holder; and an electric air blower positioned in said air intake case for, upon energization thereof, generating air flow from said air inlet opening to the passenger compartment through the interior of the air box, said air filter element, said first opening, the interior of said air intake case and the means for communicating the interior of said air intake case with the passenger compartment.

8. An air cleaning device as claimed in claim 7, in which each of said second and third openings is so sized as to permit insertion of hands of an operator.

9. An air cleaning device as claimed in claim 8, in which said cowl top cover and said lid are constructed of plastics.

10. An air cleaning device as claimed in claim 9, in which said lid is secured to said cowl top cover by means of bolts.

11. An air cleaning device as claimed in claim 10, in which the third opening of said cowl top cover is rectangular in shape and rimmed by a rectangular bank, and in which said lid has a rectangular bank portion which is sized and shaped as to mate with said bank of said third opening.

12. An air cleaning device as claimed in claim 11, in which said rectangular bank of said cowl top cover is formed on and around a top surface thereof with a rectangularly extending ridge, and in which said lid is formed at its depressed inner wall with a rectangularly extending groove, said ridge being mated with said groove for achieving a tight connection between said lid and said cowl top cover.

13. An air cleaning device as claimed in claim 12, in which said cowl top cover is secured to said transversely extending upper part of said cowl top panel by a sealing member positioned therebetween.

14. An air cleaning device as clammed in claim 13, in which said lid is secured to said cowl top cover by a sealing member positioned therebetween.

15. An air cleaning device as claimed in claim 7, in which said second opening is surrounded by a water flowing gutter which is defined by the transversely extending upper part of said cowl top panel.

* * * * *